(12) United States Patent
Custodis et al.

(10) Patent No.: US 6,679,617 B1
(45) Date of Patent: Jan. 20, 2004

(54) FLAT ILLUMINATION DEVICE (75) Inventors: Udo Custodis, Munich (DE); Angela Eberhardt, Augsburg (DE); Michael Ilmer, Rott am Inn (DE); Michael Seibold, München (DE)

(73) Assignee: Patent-Treuhand-Gesellschaft fuer Eleckrische Gluehlampen mbH, Munich (DE)

( * ) Notice: Subject to any disclaimer, the term of this patent is extended or adjusted under 35 U.S.C. 154(b) by 125 days.

(21) Appl. No.: 09/890,976

(22) PCT Filed: Nov. 14, 2000

(86) PCT No.: PCT/DE00/03968

§ 371 (c)(1), (2), (4) Date: Aug. 8, 2001

(87) PCT Pub. No.: WO01/44717

PCT Pub. Date: Jun. 21, 2001

(30) Foreign Application Priority Data

Dec. 13, 1999 (DE) .......................... 199 60 053

(51) Int. Cl.$^7$ ................................ F21V 33/00
(52) U.S. Cl. .................. 362/234; 362/84; 362/145; 362/503; 313/634
(58) Field of Search .......... 362/84, 503, 125, 362/145, 147, 234; 313/634, 514

(56) References Cited

U.S. PATENT DOCUMENTS

| | | | | |
|---|---|---|---|---|
| 4,494,326 A | * | 1/1985 | Kanamori | 362/84 |
| 5,126,632 A | * | 6/1992 | Parker | 313/634 |
| 5,589,730 A | | 12/1996 | Brassier et al. | 313/493 |

FOREIGN PATENT DOCUMENTS

| | | |
|---|---|---|
| EP | 0 926 705 | 6/1999 |
| FR | 2.046.558 | 3/1971 |
| FR | 2.738.783 | 3/1997 |
| GB | 2.126.328 | 3/1984 |
| WO | 98/43277 | 10/1998 |

* cited by examiner

Primary Examiner—Stephen Husar
(74) Attorney, Agent, or Firm—Robert F. Clark (57) ABSTRACT

A flat lighting device (1) has two mutually opposite, at least partially transparent view surfaces in such a way that light from a light source, for example daylight or ambient light, backlighting the lighting device can pass through the transparent part (4) of the view surfaces. Moreover, the lighting device has at least one integrated light source, the, or each, light source being arranged in such a way that during operation a corresponding luminous area (2) inside at least one of the two view surfaces is formed by the, or each, light source.

11 Claims, 6 Drawing Sheets

FLAT ILLUMINATION DEVICE

TECHNICAL FIELD

The invention relates to a flat lighting device.

In particular, what is involved is a lighting device for lighting spaces, for example in buildings or mobile facilities such as, for example, vehicles or aircraft and ships. Various aspects are to be considered in this case such as, for example, the desired light intensity distribution in the space, the color temperature of the light, but also architectural and economic aspects. Moreover, for physiological and economic reasons daylight is also usually included in the light planning of rooms in buildings.

PRIOR ART

Daylight obtained with the aid of windows is generally used to light rooms of buildings. Given good daylight conditions, artificial light sources can be dispensed with in some circumstances by careful selection of the size and number of the windows. Artificial light sources are indispensable for interior lighting, at least given unfavorable daylight conditions and in the case of darkness. This problem has been resolved to date by providing within the room —in addition to the window or windows for utilizing the daylight—further light sources, for example electric lamps, candles, optical conductors etc. It is disadvantageous, inter alia, that the light intensity distribution inside the room changes with the change in illumination from daylight to artificial light.

SUMMARY OF THE INVENTION

It is the object of the present invention to circumvent the disadvantage of the prior art and provide a lighting device which is improved for this purpose.

This object is achieved with a flat lighting device having the features of claim 1. Particularly advantageous refinements are to be found in the dependent claims.

The basic idea of the invention consists in integrating the daylight and the artificial light for interior lighting in a single flat lighting device. Put simply, the realization of this basic idea can be seen in suitably modifying a flat lamp in such a way that the latter can also be used as a window, or else, regarded in the opposite way, in suitably modifying a window in such a way that the latter also functions as a lamp.

The lighting device according to the invention is not limited in this case to the possible use of daylight in the strict sense, that is to say to the configuration in the form of an "outer window" lighting device, but rather the latter is merely to be highlighted here as a particularly interesting variant. Rather, interest also attaches to the additional use of other light sources for backlighting the lighting device, for example in the form of an "inner window" lighting device of a room divider, as a result of which it is also possible, if appropriate, to use the light of the adjoining room.

All that is essential for the purpose of the invention is for the lighting device both to have transparent regions for the light from the backlighting source, for example daylight, ambient light, through which, if appropriate, the daylight or, more generally, background light can pass and to have regions which shine owing to one or more integrated artificial light sources inside the lighting device.

For this purpose, the flat lighting device according to the invention has two extended view surfaces, which are situated opposite one another and are at least partially transparent, and at least one integrated light source, for example a flat fluorescent lamp. The, or each, electric light source is designed and arranged in such a way that the latter defines a corresponding luminous area inside at least one of the two view surfaces. A transparent part of the view surface adjoins the, or each, luminous area in each case. The term "transparent" which has been used is intended to be understood as generalizing the invention to the extent that both transparent, that is to say clear, and only translucent, for example matt or dull materials are covered for said regions. All that is essential is for at least a portion of the light of the backlighting (daylight, ambient light, or the like) to be passed through these regions.

It can, in particular, also be advantageous to construct at least one luminous area in each case inside both view surfaces. In this case, the lighting device specifically shines to both sides when operating. It is therefore possible, for example, in the case of application to an outer window, to implement interior lighting on the view surface of the lighting device facing the interior, and a luminous advertisement, an information sign or some other luminous information content on the view surface facing outward.

It is advisable to tune the ratio between the total luminous area and the entire transparent or translucent part of the respective view surface for the purpose of a compromise which is suitable in practical terms between the function as a window on the one hand, and the function as a lamp during operation, on the other hand. However, there is no need for this compromise if success is achieved in likewise designing the, or each, integrated light source of the lighting device according to the invention to be at least partially transparent. The point is that the regions of the light source which act as a luminous area during operation then likewise act in the disconnected state as transparent or translucent parts of the two view surfaces, that is to say, if appropriate, the total view surface of the flat lighting device then acts as a window. This aspect is taken up again further below.

It is advantageous in each case to select the number, dimensions and distribution of the integrated light sources, and consequently of the luminous areas, for the purpose of being able to generate in operation a spatial light distribution similar to daylight.

Strip-shaped light sources alternating with likewise strip-shaped transparent or translucent regions have proved, inter alia, to be suitable in this context. Otherwise, however, the most varied shapes are also suitable. The presentation is subject to certain limits in this regard, however, owing to esthetic viewpoints and considerations of the possibility of economic production. Suitable, inter alia, in any event are light sources with shapes which are circular or at least resemble a circle, for example oval or elliptical as well as rectangular, diamond-shaped, hexagonal or similarly shaped ones which are arranged distributed within the two surfaces and are adjoined by transparent regions. Reference is made to the exemplary embodiments for further details on this.

By way of example, a suitably shaped flat, closed electric lamp, for example a flat gas discharge lamp, is suitable for the, or each, integrated light source.

In a preferred design, the, or each, electric lamp is designed as a flat gas discharge lamp with dielectrically impeded electrodes. Specifically, this type of lamp has an at least partially transparent flat discharge vessel which is filled with an ionizable filling, for example xenon, and has a baseplate and a front plate which typically consist of an at least substantially transparent insulant, for example glass. Dielectrically impeded electrode tracks are arranged on the baseplate and/or front plate in such a way that the front plate acts as a luminous area during operation.

According to the invention, the individual flat lamps are arranged on the glass plate of a window or else between the two glass plates of a double window. In any event, during operation the front plate (luminous on one side) and optionally also the baseplate (luminous on both sides) of each flat lamp likewise correspond(s) to a luminous area. Reference may be made to the publication WO-98/43277, whose disclosure is hereby taken as reference, for further details relating to the design of such flat lamps. In the case of the double window, the regions of the glass plate of the window, or the two glass plates, adjoining the two-dimensional extent of the front plate or baseplate of each flat lamp function as transparent regions within the two view surfaces of the arrangement. This ensures that the light from backlighting, for example daylight, can pass through these regions and contribute in this way to the overall luminous efficacy of the lighting device.

The advantage of this approach is, inter alia, the modular design which can be scaled in principle for windows of virtually any dimensions. Furthermore, the need for expensive filling gases, xenon in the example, is limited to the inner volumes of the relatively compact discharge vessels of the individual lamp modules.

A further preferred variant relates to a modified double window, in which the two glass plates act simultaneously as baseplate and front plate, respectively, of a single flat lamp. The dimensions of the flat lamp thus correspond substantially to those of the glass plates of the modified double window. The front and rear view surfaces of the lighting device are therefore formed by the outer wall of the front plate and baseplate, respectively. The two glass plates are connected in a gastight fashion to a discharge vessel, for example with the aid of a circumferential frame between the two plates. The individual light sources are implemented by arranging groups of electrode tracks on the baseplate and/or front plate, for example by means of conventional printing technology. The entire lamp is subdivided in this way, as it were, into a plurality of segments which act in each case as light sources. The shape of the, or each, luminous area corresponds substantially to that of the corresponding electrode group. The latter can be brought into virtually any desired flat shape in a simple way known per se, for example by means of printing processes known from thin-film and/or thick-film technology. The subregions surrounding the lamp segments act like a conventional window, that is to say they are transparent to daylight (or to background lighting in general). Ideally, the transparent regions consist of glass or another similarly transparent insulant in order to weaken as little as possible the background lighting passing through. However, the invention is to be regarded in a generalized fashion to the effect that even materials which are less effectively transparent, for example dully translucent materials, are also included.

The individual electrode groups can also, however, be capable of being driven separately, for example for a dimming operation, a flashing function or other visual lighting effects.

In any case, the, or each, region of the front plate which is provided as a luminous area during operation is provided with a fluorescent layer. In order to increase the luminance on the front plate, the, or each, region of the baseplate which is produced on the front plate by projecting a region, coated with fluorescent material, can have a light-reflecting layer.

The advantage of this variant is the relative ease with which it can be produced with relatively few production steps, since what is involved here is not, as previously, closed lamp modules which are to be produced individually, but just individual similar segments of a single lamp. The printing technology previously mentioned and capable of effective scaling in terms of area is, for example well suited to this purpose; in this case all the electrode groups of the overall window plate are applied by means of a single printing process. However, it is disadvantageous that because of the comparatively large volume of the double window discharge vessel, the quantity of filling gas, for example xenon, which is sometimes expensive, is likewise relatively large. Reference is made to the publication EP 0 926 705 A1, whose disclosure is hereby taken in reference, for further details with regard to flat lamps with dielectrically impeded electrode groups.

According to the present state of development, light yields of approximately 28 lm/W and light intensities per electric power (efficiency) of approximately 10 cd/W can be realized with such flat lamps on the basis of dielectrically impeded discharges. Depending on the target luminance of the luminous area and on the desired luminous flux emitted by the lighting device, it is possible to estimate therefrom the fraction of the luminous area required in relation to the entire view surface.

Table 1, which follows, is intended to illustrate this, the table being based, in addition to the abovementioned values for the light yield and efficiency, on a lighting device with a view surface of 1 $m^2$ (corresponding to 100%) and a luminance of 5000 $cd/m^2$ (that is to say largely non-glare and therefore suitable for interior lighting).

TABLE 1

| Proportion of the luminous area in % | Luminous flux in lm | Electric power conconsumption in W |
| --- | --- | --- |
| 99 | 13860 | 495 |
| 50 | 7000 | 250 |
| 10 | 1400 | 50 |
| 1 | 140 | 5 |

As shown by comparison with the luminous flux of a 100 W incandescent lamp of typically 1380 lm, there is a need in practice for luminous area fractions of more than 1%, typically at least a few percent, in order in any event to ensure an adequate level of lighting in interiors. On the other hand, the transparent part is generally not less than 1%, typically not less than a few percent, because otherwise the fraction of the light from the background lighting (daylight, ambient light, lighting of a neighboring room etc.) passing through is too low. An exception here is constituted by the variant in which the luminous areas, electrodes and other lamp components are themselves likewise (partially) transparent. It is possible in principle in this case for the entire view surface to be designed as a transparent luminous area. The dual function, mentioned at the beginning, of the lighting device is fulfilled even then.

Table 2, which follows, relates to a targeted luminance of approximately 7000 $cd/m^2$ such as is suitable for exterior applications, for example for advertising purposes.

TABLE 2

| Fraction of the luminous area in % | Luminous flux in lm | Electric power consumption in W |
|---|---|---|
| 50 | 9800 | 350 |
| 10 | 1960 | 70 |

DESCRIPTION OF THE DRAWINGS

The invention is to be explained below in more detail with the aid of a plurality of exemplary embodiments. In the drawing.

Figure 1:
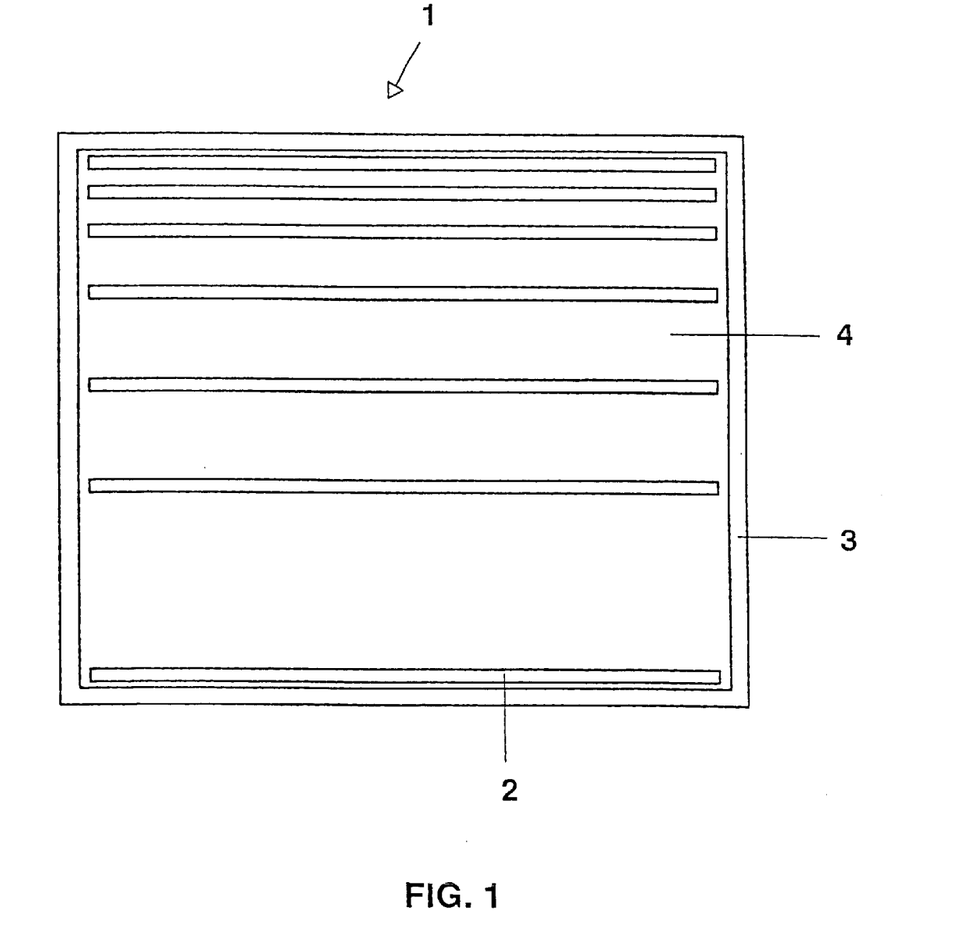
FIG. 1 shows a first exemplary embodiment of a semi-transparent lighting device according to the invention with strip-shaped luminous areas.

FIG. 1 shows a schematic illustration of a substitute for a window in the form of a semi-transparent lighting device 1 according to the invention with a total of seven strip-shaped luminous areas 2 and a mounting frame 3. The mutual spacing of the horizontally oriented luminous strips 2 becomes successively smaller upward, that is to say viewed in the direction of the room ceiling in the mounting position. This has the advantage that in the primary direction of view from the window, typically the lower half of the window, for example, the transparent fraction of the view surface is relatively large, and the view through is therefore largely unimpeded. Moreover, the luminous strips 2 are relatively narrow by comparison with the transparent regions 4 respectively situated therebetween. On the other hand, the higher density of strips at the top, in the direction of the ceiling, permits a light intensity distribution in the room which is similar to the typical incidence of daylight which can, if appropriate, be specifically varied even further by means of supplementary reflector elements in the upper part and/or above the "window". In addition, it is possible to provide for the luminous strips 2 being capable of being electrically switched separately in order to be able to adapt the luminous intensity to the actual requirements in a flexible way. In a variant which is not illustrated, both the inner and the outer view surfaces of the semi-transparent lighting device 1 have luminous areas 2, that is to say the lighting device 1 shines in this case not only in the direction of the interior, but also on both sides of the plane of the window.

Figure 2:
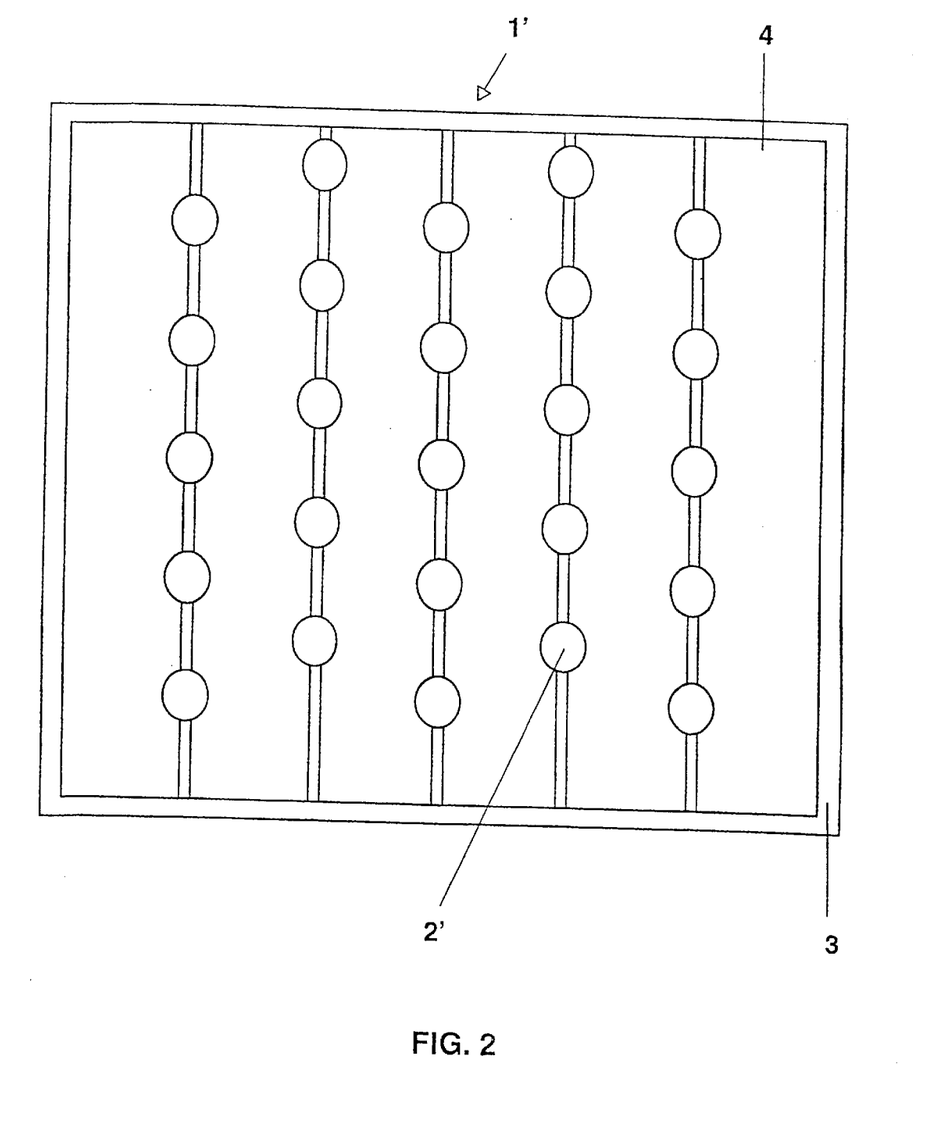
FIG. 2 shows a further exemplary embodiment of a semi-transparent lighting device according to the invention with circular luminous areas.

FIG. 2 shows a schematic illustration of a further substitute for a window. The same features are provided here with the same reference numerals. The luminous areas 2' are oval here and can be switched electrically in columns. The diameter of each luminous area 2' is small by comparison with the dimensions of the "window" 1', and so there is relatively little disturbance of the view through outward. Moreover, the circular luminous areas 2' are distributed uniformly over the inner view surface of the window substitute, so as to avoid a possibly disturbing "strip effect" as in FIG. 1. In the regions which are situated opposite the luminous areas 2', a reflecting layer is deposited onto the outer view surface (not illustrated). In this way, the window substitute shines only into the interior and not to the outside. This has the advantage of improving the efficiency with regard to the interior lighting.

Figure 3A:
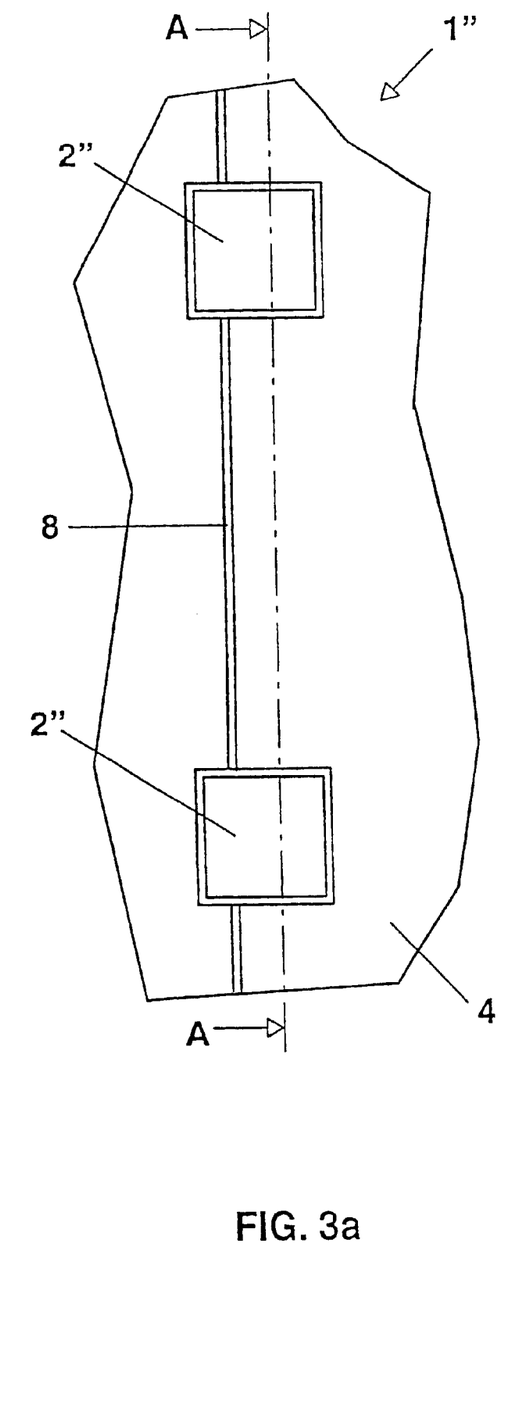
FIG. 3a shows a schematic plan view of a further exemplary embodiment with square luminous areas.
Figure 3B:
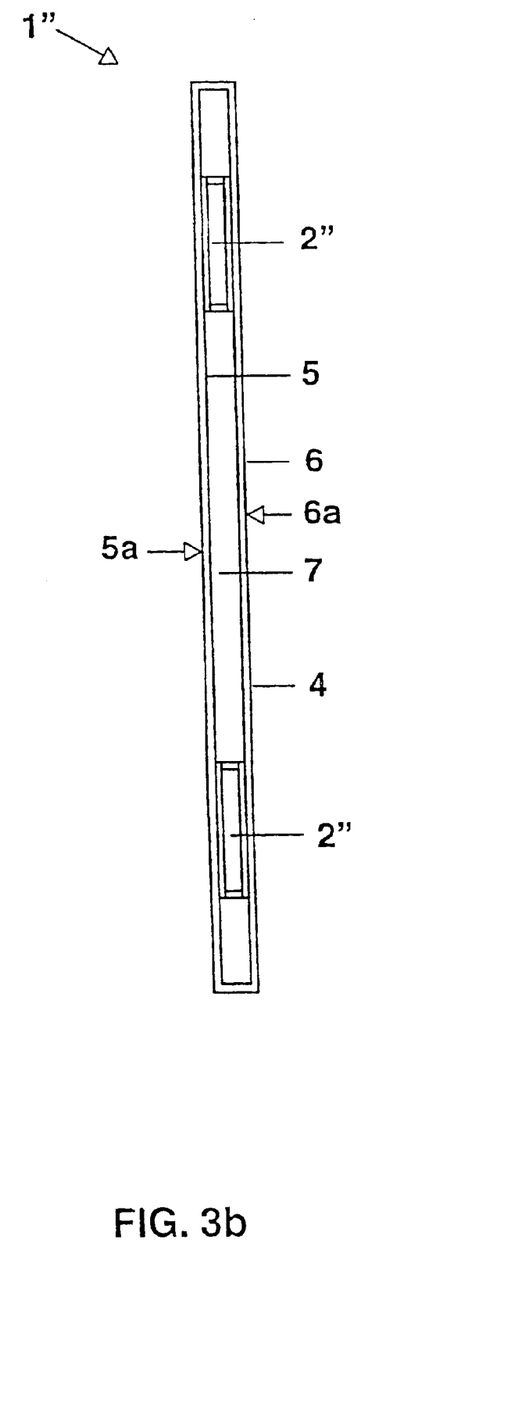
FIG. 3b shows a schematic cross section of FIG. 3a along the line AA.

FIGS. 3a and 3b show, respectively, details of a schematic plan view and a cross section along the line AA of a further exemplary embodiment 1'' with square luminous areas 2''. What is involved in this case is individual flat lamps with dielectrically impeded electrodes of the type disclosed, for example, in the already cited WO 98/43277. The flat lamps 2'' filled with xenon are arranged between the two glass plates 5, 6 of a double window. The interior 7 of the double window can likewise be filled with a gas or gas mixture, for example with dried air, or else be evacuated. The flat lamps 2'' of a row are interconnected by means of supply leads 8 and can be driven in rows. During operation, the flat lamps 2'' serve as luminous areas within the view surfaces defind by the outer surfaces 5a, 6a of the two glass plates 5, 6. Owing to the use of individual closed flat lamps, the relatively expensive xenon filling is limited to the interior of these lamps and not to the substantially larger interior of the actual double glass window.

Figure 4:
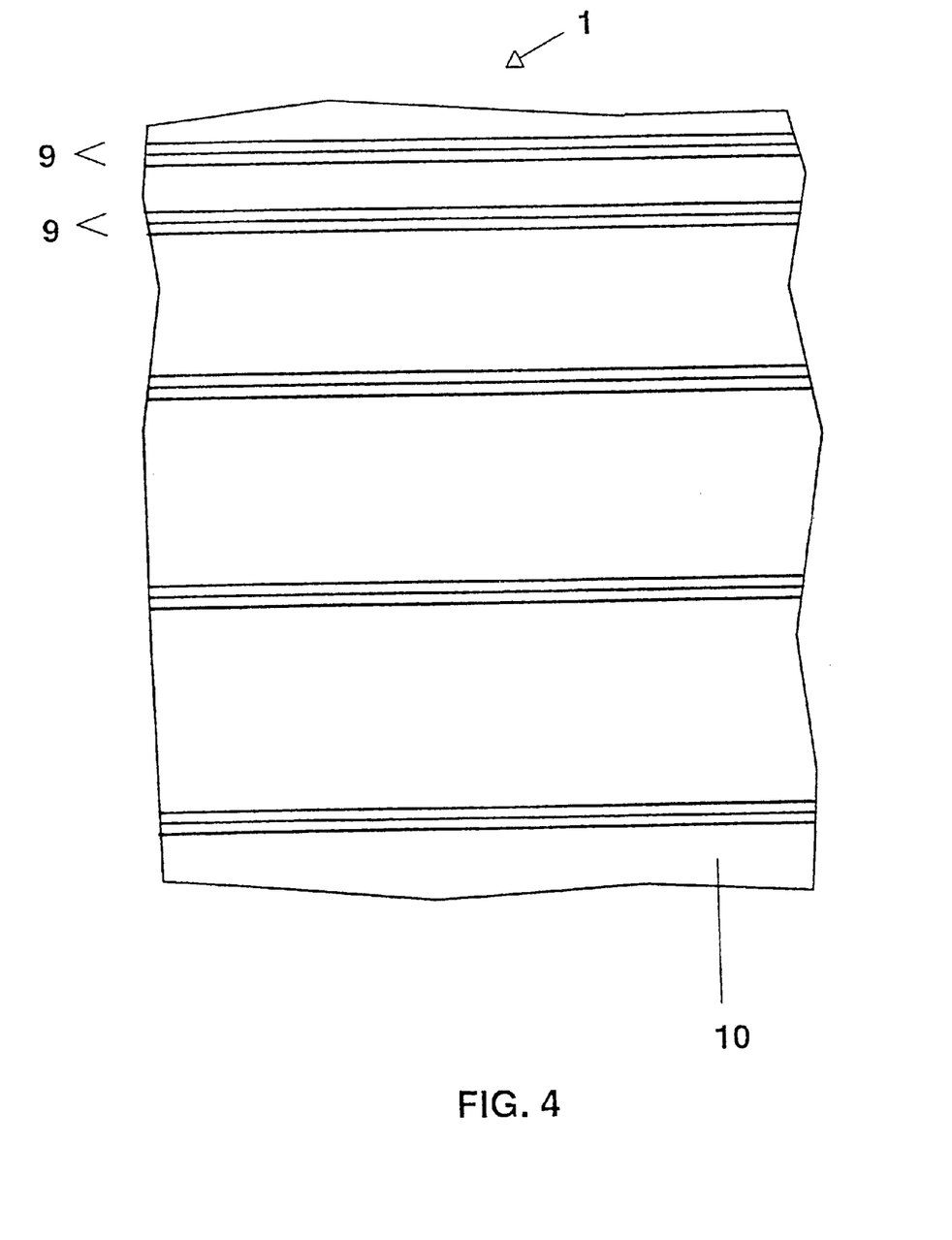
FIG. 4 shows an electrode design for the exemplary embodiment of FIG. 1.

FIG. 4 shows a detail of the electrode configuration of the exemplary embodiment of FIG. 1. In this case, three parallel electrode tracks printed using the screen printing method onto the first glass plate of the double window, the baseplate, are combined in each case to form strip-shaped electrode groups 9. These are coated with a glass barrier as dielectric (not illustrated). In the preferred unipolar or bipolar pulse operation in accordance with publication EP 0 733 266 B1, a multiplicity of individual partial discharges (not illustrated) form between neighboring electrode tracks of differing polarity. The strip-shaped subregions of the second glass plate, the front plate, which correspond to the electrode groups 9 are coated with fluorescent material. These strip-shaped subregions then act during operation of the lamp as the strip-shaped luminous areas 2 illustrated in FIG. 1. The front plate is uncoated, that is to say clear, between the luminous areas 2. This holds in the same way for the corresponding regions 10 between the electrode groups 9. As a result, the background light, for example daylight, can pass through largely unimpeded between the electrode groups 9 and luminous areas 2. In this regard, the semi-transparent flat lighting device according to the invention acts like a conventional window. The spacing between the two glass plates is approximately 3 to 5 mm, and they are connected (not illustrated) in this case with the aid of glass solder as a seal via a glass frame forming the outer edge of the discharge volume. The discharge volume thus tightly enclosed contains as discharge filling an Xe filling at approximately 100 mbar (=10 kPa). Reference is made to the already cited EP-0 926 705 A1 for further details regarding flat lamps with electrode groups.

Figure 5:
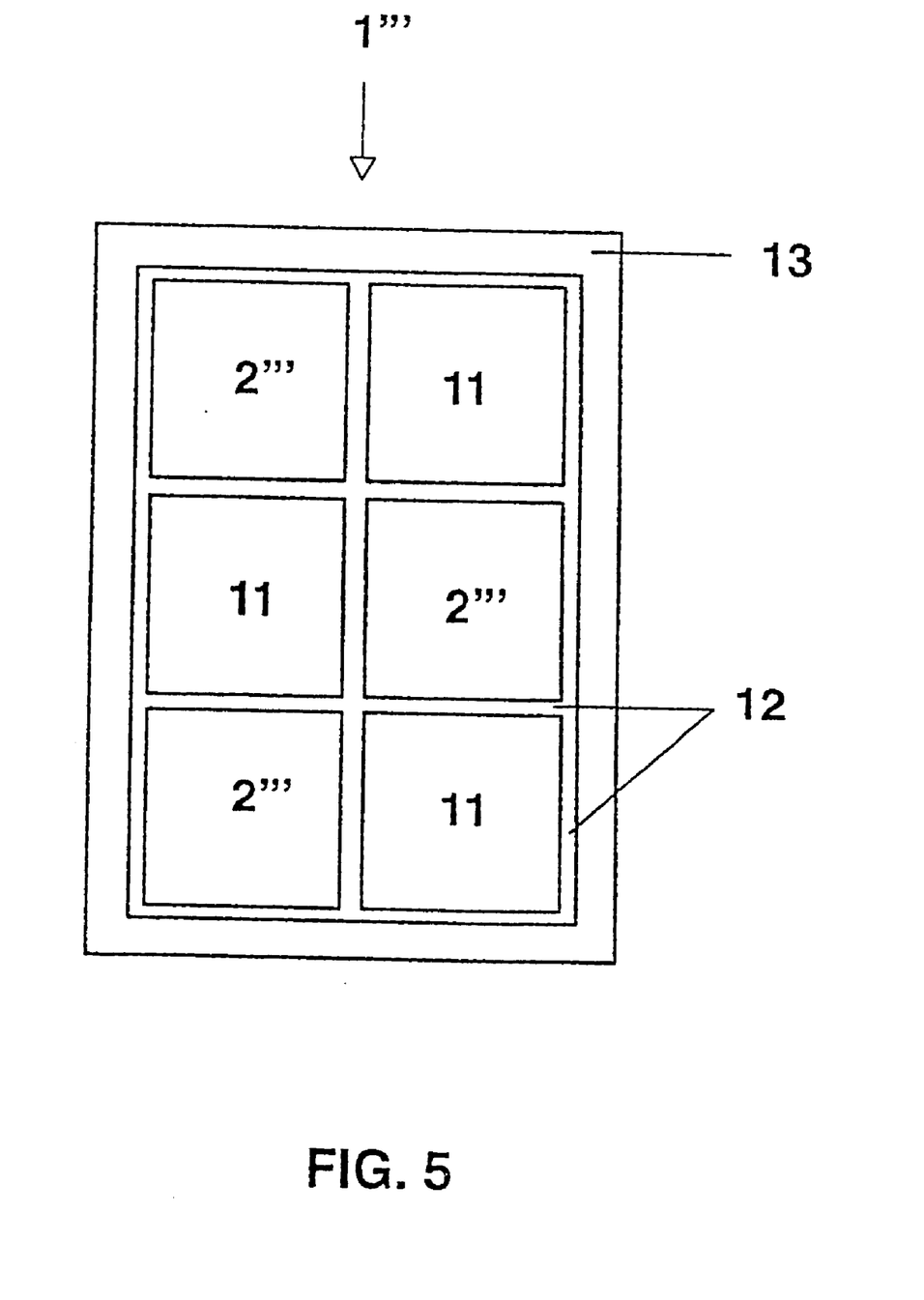
FIG. 5 shows a further exemplary embodiment in the form of a mosaic window.

FIG. 5 shows as a further exemplary embodiment a mosaic-type window substitute 1''' in a schematic illustration. It comprises three rectangular flat lamps 2''' and three similarly shaped window glasses 11. At approximately 7 to 10 mm, the thickness of the flat lamps 2''' corresponds roughly to the thickness of the window glasses 11. All six parts 2''', 11 are joined to one another at their abutting edges by means of lead strips 12 and are framed to form the window substitute 1''' with the aid of a mounting frame 13. During operation, the flat lamps 2''' form the luminous areas, while the window glasses 11 form the transparent parts of the window substitute 1'''. The front and rear sides of the entirety of the flat lamps 2''' and window glasses 11 form the two view surfaces. For decorative reasons, the window glasses 11 and/or the flat lamps 2''' can also be colored, for example including variously. Moreoever, the individual parts can also be of different shape than rectangular, for example diamond-shaped, hexagonal or the like. All that is important in this respect is that the individual parts can be joined together to form a window substitute 1'''.

Figure 6A:
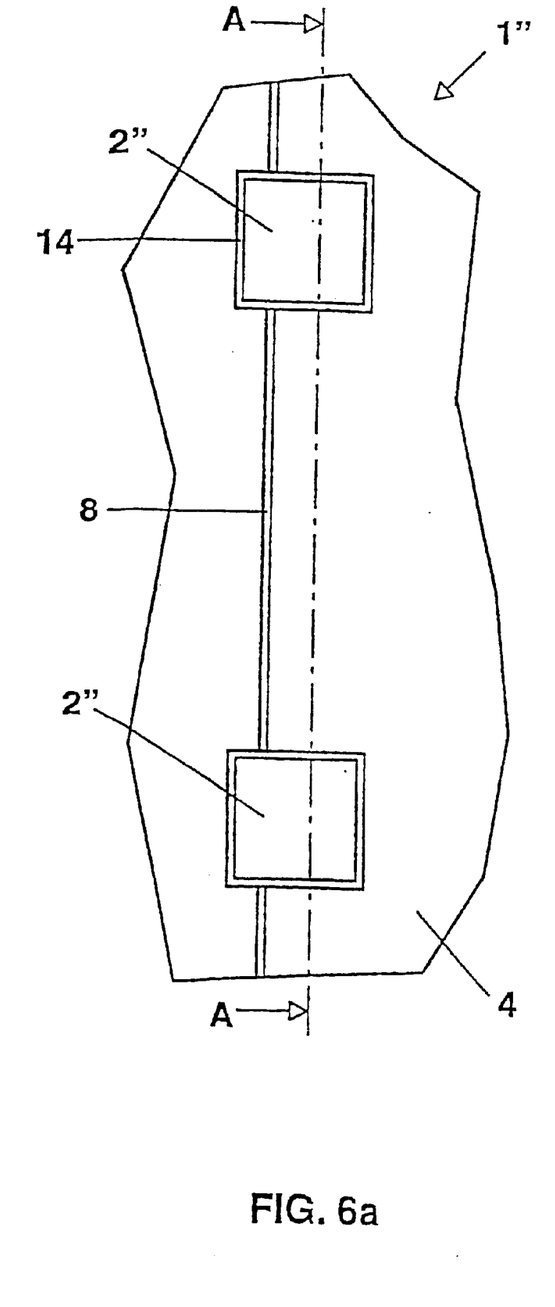
FIG. 6a shows a schematic plan view of a variant of FIG. 3a, and FIG. 6b shows a schematic cross section of FIG. 6a along the line AA.
Figure 6B:
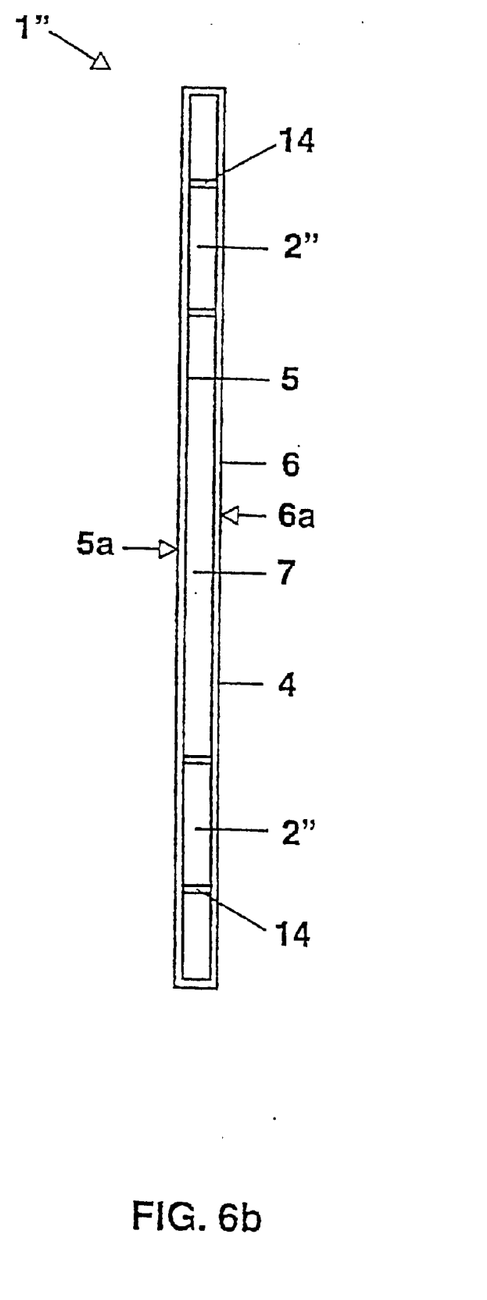

FIGS. 6*a*, 6*b* show a variant of the exemplary embodiment illustrated in FIGS. 3*a*, 3*b*. Identical features are denoted once again by the same reference numerals. The discharge vessel of each flat lamp 2" filled with xenon is formed here by virtue of the fact that a frame 14 with a rectangular circumference is fitted in each case between the two window plates 5, 6. The fluorescent material and the electrodes are then applied (not illustrated) directly to the inner walls of the window plates 5, 6 inside the region surrounded by the frame. It is possible in this way to dispense in each case with the additional baseplate and front plate of the discharge vessel of a flat lamp in accordance with FIGS. 3*a*, 3*b*. The details of the design are otherwise similar to FIGS. 3*a*, 3*b*. Reference may be made in addition to WO 98/43277, already cited more than once.

In a development, the materials used are at least translucent, such that substantially all the view surfaces of the flat lighting device can also act as windows. It is conceivable, for example, to use transparent electrically conductive layers, made from indium zinc oxide (ITO), for example, for the electrode tracks. Moreover, the fluorescent layer can also be of very thin design such that the regions of the light segments are at least dully translucent.

What is claimed is:

1. A flat lighting device having two mutually opposite, at least partially transparent view surfaces, and a plurality of strip-shaped, integrated light sources, the light sources defining a corresponding luminous area inside at least one of the view surfaces, a transparent part of the view surfaces adjoining each luminous area, the mutual spacing of the luminous areas becoming successively smaller in one direction.

2. The device of claim 1 wherein the, integrated light sources are capable of being separately electrically switched.

3. The device of claim 1 wherein the luminous areas are formed in both view surfaces.

4. A flat lighting device having two mutually opposite, at least partially transparent view surfaces, and a plurality of integrated light sources, the integrated light sources comprising individual closed flat lamps disposed between the viewing surfaces, the individual closed flat lamps having an ionizable filling and electrodes for forming a dielectrically impeded discharge, the integrated light sources defining luminous areas inside at least one of the view surfaces, and a transparent part of the view surfaces adjoining each luminous area.

5. The device of claim 4 wherein the integrated light sources are oval.

6. The device of claim 4 wherein the integrated light sources are rectangular.

7. The device of claim 5 wherein the integrated light sources are arranged in columns.

8. The device of claim 4 wherein each lamp contains a fluorescent layer.

9. The device of claim 4 wherein each lamp can be driven separately.

10. The device of claim 4 wherein the lamps have a front plate formed by a portion of one of the view surfaces and a back plate formed by a portion of the other view surface.

11. The device of claim 4 wherein the flat lamps are partially transparent.

\* \* \* \* \*